United States Patent Office 3,506,397

Patented Apr. 14, 1970

3,506,397

PHOSPHORIC ACID RECOVERY FROM SPENT PLASTIC CONDITIONER SOLUTION

William R. Vincent, Birmingham, James J. Christie, Rochester, and John L. Griffin, Romeo, Mich., assignors to General Motors Corporation, Detroit, Mich., a corporation of Delaware

No Drawing. Filed Dec. 22, 1967, Ser. No. 692,668

Int. Cl. C01b *25/18*

U.S. Cl. 23—165 3 Claims

ABSTRACT OF THE DISCLOSURE

Prior to electrodeposition of metal on an acrylonitrile-butadiene-styrene resin, it is necessary to condition the resin surface. A phosphoric acid-potassium permanganate solution is suitable for this conditioning operation. When the conditioning solution is spent, phosphoric acid is recovered by adding oxalic acid to the solution until it is substantially colorless and subsequently filtering off all solid matter.

This invention relates to the conditioning of ABS resins with a phosphoric acid-potassium permanganate solution preparatory to subsequent electrodeposition of a metal onto a surface of the resin. More particularly, this invention relates to a method of recovering phosphoric acid from a spent conditioner solution.

Currently there is a great deal of comercial interest in the electrodeposition of metals upon ABS resin substrates for use as trim components on automobiles. Before the plating of a metal on ABS resins, it is necessary to condition the resin surface which is to be plated. As disclosed in a copending U.S. patent application, S.N. 692,702, filed Dec. 22, 1967, assigned to the assignee of this invention, a phosphoric acid-potassium permanganate solution is particularly suitable as the resin conditioning agent. In general, the conditioner solvent consists of about 50–90% $H_3PO_4$ and the balance water. Potassium permanganate, or other suitable permanganate salt, is dissolved in the strong phosphoric acid solution in a concentration of from about 5 grams per liter up to the saturation point of the salt in the acid. During the use of the resin conditioner solution, the permanganate content is gradually depleted. Periodically the solution must be analyzed and permanganate additions made to maintain the concentration of this component within the defined limits. After prolonged use and repeated permanganate additions, however, the conditioner bath becomes very viscous and gradually loses its effectiveness. It is then necessary to prepare a fresh solution. However, for economical operation it is necessary that the phosphoric acid be recovered from the spent bath for reuse with additional potassium permanganate.

Accordingly, it is an object of the present invention to provide a method of recovering phosphoric acid from a spent conditioner solution, which acid is suitable for reuse in freshly prepared conditioner baths.

It is a more specific object of the present invention to provide a simple method of recovering phosphoric acid from a complex mixture of the same with potassium permanganate and other manganese-containing chemical species, wherein manganese has an oxidation state of from +2 to +6, without contaminating the phosphoric acid with other chemical entities.

In accordance with the subject invention these and other objects are accomplished by first slowly adding portions of oxalic acid to the spent purple permanganate solution until the liquid just turns substantially clear and colorless. During the addition of oxalic acid a precipitate is formed and carbon dioxide evolved. Preferably, the addition is made at normal room temperature. When sufficient oxalic acid has been added to render the liquid substantially colorless all solid matter is then filtered therefrom. The clear filtrate is substantially phosphoric acid and water in the proportions originally prepared. Additional potassium permanganate, or other suitable permanganate salt, is added to the filtrate in the proportions set forth in the above-identified copending application to prepare a fresh ABS resin conditioner bath.

As noted above, an excellent conditioner solution for the treatment of ABS resins for electroplating comprises a solvent consisting of 50–90% phosphoric acid and the balance water. Potassium permanganate is dissolved in this strong acid solvent in the amount of about 5–25 grams per liter of solvent. The resulting conditioner bath is employed to treat ABS resin workpieces simply by immersion of the workpieces therein. Upon exposure to air and repetitive contact with ABS resin workpieces, the activity of the bath is gradually depleted. The formation of a brown precipitate is noted which presumably is manganese dioxide. It is also believed that other chemical species containing manganese, whether soluble or insoluble in the phosphoric acid solvent, may be formed wherein the manganese is in an oxidation state of from +2 to +6. The fate of the permanganate ions which are depleted by usage of the bath is not known in detail and the subject invention certainly is not predicated upon such knowledge. It has been found that the permanganate content decreases and additional permanganate must be added to maintain the activity of the bath. Eventually, however, in a matter of a few days or a week or so, depending upon the usage of the bath, the liquid becomes more and more viscous and it becomes increasingly difficult to drain the conditioner from the resin as the workpiece is lifted from the bath. At this stage it is deemed necessary to replace the bath and start with a fresh solution of potassium permanganate in concentrated phosphoric acid. However, it is not desirable to simply throw away phosphoric acid from the spent solution.

In accordance with the subject invention the spent phosphoric acid-permanganate solution is treated with oxalic acid to recover the phosphoric acid. Substantially pure oxalic acid, preferably in particulate form, is slowly stirred into the spent conditioner mixture. Upon the addition of oxalic acid the deep purple color of the bath is observed to diminish, the evolution of carbon dioxide is noted, and a pinkish-white precipitate is formed. Preferably the addition of the oxalic acid is continued just to the point at which the liquid becomes colorless and no further evolution of gas is noted. The oxalic acid is believed to reduce the excess permanganate and possibly other manganese-containing chemical species to compounds which have little, if any, solubility in the phosphoric acid. All the solid matter, whether formed before or after the oxalic acid addition, is filtered from the phosphoric acid. The clear filtrate is reusable in the preparation of fresh conditioner baths.

It is preferred that the amount of oxalic acid employed in accordance with the invention be just that necessary to chemically reduce the potassium permanganate to manganous phosphate and render the phosphoric acid and water solvent substantially colorless. The addition of excess oxalic acid results in the presence of free oxalic acid in the solvent. This is not particularly harmful but oxalic acid will reduce its chemically equivalent amount of potassium permanganate which may be subsequently added to the filtrate. The amount of oxalic acid which must be added to the spent solution will, of course, vary depending upon the potassium permanganate content as well as the content of manganese in other forms which may be reactive with oxalic acid. Therefore, the first time that the invention is practiced with respect to a given bath, preferably relatively small amounts of oxalic acid are slowly added and the effect observed just as a titration would be performed in analytical chemical practice. After a few conditioner baths of similar permanganate concentration and number of make-up additions of potassium permanganate have been prepared and recovered, experience will teach the approximate quantities of oxalic acid which may be required in a given case.

When phosphoric acid is being recovered from an ABS resin conditioner solution of the type described, it is generally preferred that the oxalic acid be added in the solid state so as not to dilute the strong phosphoric acid solution. However, when the subject process is being employed to recover $H_3PO_4$ from a phosphoric acid-permanganate solution which is employed for other purposes, there may be no objection to dilution of phosphoric acid and an aqueous or other suitable solution of the oxalic acid may be employed.

A specific example will further illustrate the practice of the invention. Fifteen grams of potassium permanganate was dissolved in four hundred milliliters of water. To this solution was slowly added six hundred milliliters of 85% phosphoric acid. This resulting solution is suitable for conditioning ABS resins for plating. For purposes of simplicity, however, the subject recovery process will be demonstrated using the fresh conditioner solution which has not been employed in its intended use. Powdered oxalic acid was slowly added, with stirring, to the phosphoric acid-permanganate solution. The evolution of a gas was noted as well as the formation of a pinkish-white precipitate. The addition of oxalic acid powder was continued until the solution had become substantially colorless. A total of about six grams of oxalic acid was required. The mixture was filtered to remove the precipitate. The filtrate was clear and suitable for subsequent use in an ABS resin conditioner bath.

Thus, while our invention has been described in the terms of a specific embodiment thereof, it will readily be appreciated that other forms might be adapted by one skilled in the art. Therefore, the scope of the invention is intended to be limited only by the following claims.

We claim:

1. In the art of electroplating ABS synthetic resins wherein a solution of permanganate ion in phosphoric acid is employed as a resin conditioner, a method of recovering phosphoric acid from a spent said conditioner solution comprising adding oxalic acid to said solution whereby a precipitate is formed, carbon dioxide is evolved and the intense purple color of the solution is reduced, said addition being continued until the evolution of carbon dioxide ceases and the phosphoric acid is substantially colorless; removing all solids from the acid by filtration, the filtrate thus produced being suitable for reuse in a conditioner solution upon the addition of a suitable permanganate salt; and subsequently employing said filtrate as at least a portion of the phosphoric acid component of a fresh resin conditioner solution.

2. A method of recovering phosphoric acid from a spent plastic conditioner solution which has been employed to treat synthetic resins prior to the electrodeposition of metal thereon, said solution comprising phosphoric acid, water, and permanganate ions, said method comprising adding oxalic acid in particulate form to said spent conditioner solution until the phosphoric acid solution has become substantially clear and colorless and until the evolution of gas has ceased, filtering all solid matter from said phopshoric acid the filtrate thereby being rendered suitable for reuse in a said conditioner bath, and subsequently employing said filtrate as at least a portion of the phosphoric acid component of a fresh plastic conditioner solution.

3. A method of recovering phosphoric acid from a bath comprising a solvent consisting of 50–90% by volume phosphoric acid and the balance water, dissolved permanganate, and dissolved or undissolved manganese-containing compounds wherein said manganese has an oxidation number in the range of +2 to +6, said method comprising adding oxalic acid to said bath whereby a precipitate is formed, carbon dioxide is evolved and the intense purple color of said solution is reduced, the amount of said oxalic acid added being that sufficient to just render said solvent colorless; and filtering the solid matter from said solvent thereby yielding purified phosphoric acid.

References Cited

C. A. Jacobson, Encyclopedia of Chemical Reactions, 1957 2nd ed. p. 546.

OSCAR R. VERTIZ, Primary Examiner

A. HELLER, Assistant Examiner

U.S. Cl. X.R.

204—181